(12) United States Patent
Igarashi et al.

(10) Patent No.: US 11,279,117 B2
(45) Date of Patent: Mar. 22, 2022

(54) FUEL CONTAINER

(71) Applicant: KURARAY CO., LTD., Kurashiki (JP)

(72) Inventors: Takeyuki Igarashi, Okayama (JP);
Shogo Nakazawa, Kurashiki (JP)

(73) Assignee: KURARAY CO., LTD., Okayama (JP)

( * ) Notice: Subject to any disclaimer, the term of this patent is extended or adjusted under 35 U.S.C. 154(b) by 311 days.

(21) Appl. No.: 16/307,006

(22) PCT Filed: Jun. 29, 2017

(86) PCT No.: PCT/JP2017/023869
§ 371 (c)(1),
(2) Date: Dec. 4, 2018

(87) PCT Pub. No.: WO2018/003904
PCT Pub. Date: Jan. 4, 2018

(65) Prior Publication Data
US 2019/0248115 A1 Aug. 15, 2019

(30) Foreign Application Priority Data
Jun. 30, 2016 (JP) .............................. JP2016-130816

(51) Int. Cl.
| | | |
|---|---|---|
| B32B 27/08 | (2006.01) | |
| B32B 27/18 | (2006.01) | |
| B32B 27/30 | (2006.01) | |
| B32B 27/32 | (2006.01) | |
| B32B 7/12 | (2006.01) | |
| B32B 27/28 | (2006.01) | |
| B65D 1/00 | (2006.01) | |
| B60K 15/03 | (2006.01) | |
| B32B 27/00 | (2006.01) | |

(52) U.S. Cl.
CPC ............... *B32B 27/08* (2013.01); *B32B 7/12* (2013.01); *B32B 27/00* (2013.01); *B32B 27/18* (2013.01); *B32B 27/28* (2013.01); *B32B 27/306* (2013.01); *B32B 27/32* (2013.01); *B60K 15/03* (2013.01); *B65D 1/00* (2013.01); *B32B 2250/04* (2013.01); *B32B 2250/246* (2013.01); *B32B 2264/105* (2013.01); *B32B 2307/558* (2013.01); *B32B 2307/7265* (2013.01); *B32B 2439/40* (2013.01); *B60K 15/03177* (2013.01); *B60K 2015/03493* (2013.01); *Y10T 428/1352* (2015.01); *Y10T 428/1379* (2015.01)

(58) Field of Classification Search
CPC ........... B32B 27/08; B32B 7/12; B32B 27/00; B32B 27/18; B32B 27/306; B32B 27/32; B32B 2250/04; B32B 2250/246; B32B 2264/105; B32B 2307/7265; B32B 2439/40; B32B 2270/00; Y10T 428/1352; Y10T 428/1379; C08L 2205/03; F16L 11/04; F16L 11/045; F16L 11/047; F16L 11/083
USPC ............................................. 428/34.1, 36.91
See application file for complete search history.

(56) References Cited

U.S. PATENT DOCUMENTS

| | | |
|---|---|---|
| 5,849,376 A | 12/1998 | Oishi et al. |
| 6,033,749 A | 3/2000 | Hata et al. |
| 2008/0003390 A1 | 1/2008 | Hayashi et al. |
| 2008/0254245 A1 | 10/2008 | Penescu et al. |
| 2011/0097527 A1 | 4/2011 | Ikeda et al. |
| 2013/0225756 A1 | 8/2013 | Igarashi et al. |
| 2014/0197175 A1 | 7/2014 | Aoe et al. |
| 2017/0183426 A1 | 6/2017 | Kawai et al. |
| 2020/0216658 A1* | 7/2020 | Ito ........................... C08L 51/06 |

FOREIGN PATENT DOCUMENTS

| | | | |
|---|---|---|---|
| JP | 5813643 | * | 1/1983 |
| JP | 9-29904 A | | 2/1997 |
| JP | 2013-224166 A | | 10/2013 |
| JP | 2016-27983 A | | 2/2016 |
| WO | WO 2005/105437 A1 | | 11/2005 |
| WO | WO 2013/099873 A1 | | 7/2013 |

OTHER PUBLICATIONS

International Search Report dated Sep. 5, 2017 in PCT/JP2017/023869 filed Jun. 29, 2017.
European Search Report issued in corresponding European Patent Application No. 17820258.6 dated Feb. 24, 2020.

* cited by examiner

*Primary Examiner* — Lee E Sanderson
(74) *Attorney, Agent, or Firm* — Morgan, Lewis & Bockius LLP

(57) ABSTRACT

Provided is a fuel container composed of a multilayer structure containing: an ethylene-vinyl alcohol copolymer (A) layer; an adhesive resin (B) layer; a high-density polyethylene (C) layer; and a resin composition (D) layer, wherein the ethylene-vinyl alcohol copolymer (A) contains 15 to 44 mol % of ethylene, the adhesive resin (B) is a maleic anhydride-modified polyolefin having an acid value of 0.1 to 10 mgKOH/g and containing 1 to 8.5 µmol/g of magnesium element, calcium element, zinc element, or a combination thereof, the resin composition (D) contains the ethylene-vinyl alcohol copolymer (A), the adhesive resin (B), and the high-density polyethylene (C), the thickness of the (A) layer, the (B) layer, and the (C) layer satisfies specific conditions, and the ethylene-vinyl alcohol copolymer (A), the adhesive resin (B), and the high-density polyethylene (C) satisfies specific conditions. The fuel container is excellent in fuel barrier properties and impact resistance and enables stable production.

19 Claims, No Drawings

FUEL CONTAINER

TECHNICAL FIELD

The present invention relates to a fuel container that is excellent in fuel barrier properties and impact resistance, and that enables stable production.

BACKGROUND ART

In recent years, as containers for storing fuels such as hydrocarbons, coextrusion blow-molded containers made of plastic have been used, and examples thereof include fuel containers for automobiles. As fuel containers made of plastic, those of polyethylene single layer have been widely adopted but have a disadvantage of having comparatively high fuel transmittance.

As a method to overcome such a disadvantage, a method of forming a multilayer including an ethylene-vinyl alcohol copolymer (which may be hereinafter abbreviated as EVOH) layer and a polyolefin layer is known (Patent Document 1). Further, in fuel containers having an EVOH layer and a polyolefin layer, a fuel container in which the EVOH layer is disposed on the inner side in order to improve the fuel barrier properties is also known (Patent Document 2).

By the way, when producing fuel containers by coextrusion blow molding or the like, loss parts during molding such as burrs generally occur. Use of a recovered material layer formed by remelting such loss parts during molding, rejected items in molding, or the like as a part of the fuel containers reduces the amount of waste and thus is preferable also in view of environmental protection, and a cost reduction effect is also obtained.

However, there have been cases where foreign matter derived from EVOH occurs in the recovered material layer, thereby reducing the impact resistance or the fuel barrier properties of fuel tanks. In particular, when continuing the production of fuel tanks over a long period of time, such foreign matter tends to occur, which has been a problem.

PRIOR ART DOCUMENT

Patent Document

Patent Document 1: US Patent Publication No. 5849376
Patent Document 2: JP9-29904 A

SUMMARY OF THE INVENTION

Problems to be Solved by the Invention

The present invention has been devised in order to solve the aforementioned problem, and it is an object of the present invention to provide a fuel container that is excellent in fuel barrier properties and impact resistance, and that enables stable production.

Means for Solving the Problems

The aforementioned problem is solved by providing a fuel container composed of a multilayer structure containing: an EVOH (A) layer; an adhesive resin (B) layer; a high-density polyethylene (C) layer; and a resin composition (D) layer, wherein the EVOH (A) contains 15 to 44 mol % of ethylene, the adhesive resin (B) is a maleic anhydride-modified polyolefin having an acid value of 0.1 to 10 mgKOH/g and containing 1 to 8.5 μmol/g of magnesium element, calcium element, zinc element, or a combination thereof, the resin composition (D) contains the EVOH (A), the adhesive resin (B), and the high-density polyethylene (C), and the fuel container satisfies formulas (1) to (6) below.

$$0.05 \leq Ma/Mb \leq 40 \tag{1}$$

$$2 \leq Ma/Mc \leq 1800 \tag{2}$$

In formulas (1) and (2) above, Ma, Mb, and Mc are respectively as follows: Ma represents a MFR (g/10 min) of the EVOH (A) (measured at 210° C. under a load of 2160 g); Mb represents a MFR (g/10 min) of the adhesive resin (B) (measured at 210° C. under a load of 2160 g); and Mc represents a MFR (g/10 min) of the high-density polyethylene (C) (measured at 210° C. under a load of 2160 g).

$$0.003 \leq Ta/Tt \leq 0.12 \tag{3}$$

$$0.0015 \leq Tb/Tt \leq 0.12 \tag{4}$$

$$0.83 \leq (Tc+Td)/Tt \leq 0.99 \tag{5}$$

$$0.02 \leq Td/(Tc+Td) \leq 0.90 \tag{6}$$

In formulas (3) to (6) above, Ta represents the total thickness of the (A) layer, Tb represents the total thickness of the (B) layer, Tc represents the total thickness of the (C) layer, Td represents the total thickness of the (D) layer, and Tt represents the overall thickness (Ta+Tb+Tc+Td).

At this time, it is suitable that the resin composition (D) contains 1 to 20 mass % of the EVOH (A), 1 to 20 mass % of the adhesive resin (B), and 60 to 98 mass % of the high-density polyethylene (C). It is also suitable that the resin composition (D) contains 0.001 to 1 μmol/g of magnesium element, calcium element, zinc element, or a combination thereof. It is also suitable that the resin composition (D) contains 0.001 to 5 μmol/g of an alkali metal element.

It is also suitable that the fuel container satisfies formula (7) below.

$$0.3 \leq (VA \times Ta)/(MT \times Tb) \leq 1000 \tag{7}$$

In formula (7) above, VA, MT, Ta, and Tb are respectively as follows: VA represents a vinyl alcohol content (mol %) in the EVOH (A); MT represents the total amount (μmol/g) of magnesium element, calcium element, and zinc element in the adhesive resin (B); Ta represents the total thickness (μm) of the EVOH (A) layer; and Tb represents the total thickness (μm) of the adhesive resin (B) layer.

It is also suitable that the EVOH (A) contains 0.04 to 13 μmol/g of an alkali metal element.

It is also suitable that the adhesive resin (B) contains 0.35 to 11.5 μmol/g of aluminum element and 0.5 μmol/g or less of titanium element.

It is also suitable that the total amount of magnesium element, calcium element, and zinc element in the high-density polyethylene (C) is 0.5 μmol/g or less.

It is also suitable that the EVOH (A) layer and the adhesive resin (B) layer are in contact with each other in the fuel container.

Effects of the Invention

The fuel container of the present invention is excellent in fuel barrier properties and impact resistance. Further, even in the case where molding of the fuel container of the present invention is continued over a long period of time, generation of foreign matter derived from the EVOH (A) in the resin composition (D) is suppressed. Accordingly, the fuel container of the present invention is stably produced and thus is excellent in productivity.

MODES FOR CARRYING OUT THE INVENTION

The fuel container of the present invention is a fuel container composed of a multilayer structure containing an EVOH (A) layer, an adhesive resin (B) layer, a high-density polyethylene (C) layer, and a resin composition (D) layer, wherein the EVOH (A) contains 15 to 44 mol % of ethylene, the adhesive resin (B) is a maleic anhydride-modified polyolefin having an acid value of 0.1 to 10 mgKOH/g and containing 1 to 8.5 µmol/g of magnesium element, calcium element, zinc element, or a combination thereof, the resin composition (D) contains the EVOH (A), the adhesive resin (B), and the high-density polyethylene (C), and the fuel container satisfies formulas (1) to (6) below.

$$0.05 \leq Ma/Mb \leq 40 \quad (1)$$

$$Ma/Mc \leq 1800 \quad (2)$$

In formulas (1) and (2) above, Ma, Mb, and Mc are respectively as follows: Ma represents the MFR (g/10 min) of the EVOH (A) (measured at 210° C. under a load of 2160 g); Mb represents the MFR (g/10 min) of the adhesive resin (B) (measured at 210° C. under a load of 2160 g); and Mc represents the MFR (g/10 min) of the high-density polyethylene (C) (measured at 210° C. under a load of 2160 g).

$$0.003 \leq Ta/Tt \leq 0.12 \quad (3)$$

$$0.0015 \leq Tb/Tt \leq 0.12 \quad (4)$$

$$0.83 \leq (Tc+Td)/Tt \leq 0.99 \quad (5)$$

$$0.02 \leq Td/(Tc+Td) \leq 0.90 \quad (6)$$

In formulas (3) to (6) above, Ta represents the total thickness of the (A) layer, Tb represents the total thickness of (B) layer, Tc represents the total thickness of the (C) layer, Td represents the total thickness of the (D) layer, and Tt represents the overall thickness (Ta+Tb+Tc+Td).

The EVOH (A) used in the present invention is obtained by saponification of an ethylene-vinyl ester copolymer. The vinyl ester is typified by vinyl acetate, but other fatty acid vinyl esters (such as vinyl propionate and vinyl pivalate) also can be used. The ethylene content of the EVOH (A) is 15 to 44 mol %. In the case where the ethylene content of the EVOH (A) is less than 15 mol %, the productivity of the fuel container decreases. The ethylene content of the EVOH (A) is preferably 18 mol % or more. Meanwhile, in the case where the ethylene content of the EVOH (A) is over 44 mol %, the fuel barrier properties are insufficient. The ethylene content of the EVOH (A) is preferably 38 mol % or less, more preferably 35 mol % or less. Further, the saponification degree of the vinyl ester component of the EVOH (A) is preferably 90% or more, more preferably 95% or more, further preferably 99% or more. When the saponification degree is less than 90 mol %, the fuel barrier properties may possibly be insufficient. The ethylene content and the saponification degree of the EVOH (A) can be determined by the nuclear magnetic resonance (NMR) technique.

The EVOH (A) may be obtained by copolymerization of monomers other than ethylene, vinyl alcohol, and vinyl ester, as long as the object of the present invention is not inhibited. Examples of the copolymerizable monomers include α-olefins such as propylene, 1-butene, isobutene, 4-methyl-1-pentene, 1-hexene, and 1-octene; unsaturated carboxylic acids such as itaconic acid, methacrylic acid, acrylic acid, and maleic anhydride, salts thereof, partial or complete esters thereof, nitriles thereof, amides thereof, and anhydrides thereof; vinyl silane compounds such as vinyltrimethoxysilane; unsaturated sulfonic acids or salts thereof; alkylthiols; and vinyl pyrrolidones. The content of monomer units other than ethylene units, vinyl alcohol units, and vinyl ester units in the EVOH (A) is generally 10 mol % or less, suitably 5 mol % or less, more suitably 1 mol % or less.

The EVOH (A) suitably contains 0.1 to 4.5 µmol/g of magnesium element, calcium element, zinc element, or a combination thereof. This further suppresses the deterioration of the EVOH (A), thereby further reducing the foreign matter derived from the EVOH (A) in the resin composition (D) in the case where the production of the fuel container is continued over a long period of time. Accordingly, further stable production of the fuel container is enabled. The total amount of magnesium element, calcium element, and zinc element in the EVOH (A) is more suitably 0.5 µmol/g or more, further suitably 1 µmol/g or more. Meanwhile, the total amount is more suitably 3 µmol/g or less, further suitably 2 µmol/g or less. Here, the molar ratio of magnesium element with respect to the total of magnesium element, calcium element, and zinc element in the EVOH (A) is more suitably 0.5 or more, further suitably 0.8 or more.

The forms of magnesium element, calcium element, and zinc element contained in the EVOH (A) are not specifically limited, and examples thereof include metal salts and metal oxides. Among these, metal salts are preferable. Examples of the metal salts include aliphatic carboxylates, aromatic carboxylates, phosphates, carbonates, sulfates, and silicates, and double salts also can be used as the metal salts. Among these, aliphatic carboxylates are preferable as the metal salts. Examples of carboxylic acids constituting the aliphatic carboxylates include aliphatic carboxylic acids having 1 to 28 carbon atoms such as formic acid, acetic acid, propionic acid, butyric acid, lauric acid, stearic acid, myristic acid, behenic acid, and montanic acid. Further, use of the double salts as the metal salts is also preferable, and hydrotalcites are more preferable. As the hydrotalcites, those described below as hydrotalcites contained in the adhesive resin (B) can be mentioned.

It is also suitable that the EVOH (A) contains 0.04 to 13 µmol/g of alkali metal elements. This accelerates the reaction of the EVOH (A) with the adhesive resin (B) to further improve the dispersibility of the EVOH (A) in the resin composition (D) layer. Further, the foreign matter derived from the EVOH (A) when the production of the fuel container is continued over a long period of time is further reduced. Accordingly, further stable production of the fuel container is enabled. In the case where the content of alkali metal elements in the EVOH (A) is less than 0.04 µmol/g, the aforementioned effects cannot be obtained. The content of alkali metal elements is more suitably 0.5 µmol/g or more, further suitably 1 µmol/g or more. Meanwhile, in the case where the content of alkali metal elements is over 13 µmol/g, the EVOH (A) easily deteriorates, and the foreign matter may possibly increase. The content of alkali metal elements is more suitably 10.5 µmol/g or less.

Examples of the alkali metal elements contained in the EVOH (A) include sodium, potassium, and lithium. The forms of these alkali metal elements are not specifically limited, and examples thereof include alkali metal salts such as aliphatic carboxylates, aromatic carboxylates, phosphates, metal complexes. Examples of the alkali metal salts include sodium acetate, potassium acetate, sodium phosphate, potassium phosphate, lithium phosphate, sodium stearate, potassium stearate, and the sodium salt of ethylenediaminetetraacetic acid. Among these, sodium acetate, potassium acetate, and sodium phosphate are suitable.

The EVOH (A) may further contain boron compounds, phosphate compounds, and the like. Addition of boron compounds can improve the melt viscosity of the EVOH (A). Further, addition of phosphate compounds can suppress coloration of molded products. Generally, the content of boron compounds is 20 to 2000 ppm in terms of boron element, and the content of phosphate compounds is 10 to 500 ppm in terms of phosphate radical.

As long as the effects of the present invention are not inhibited, the

EVOH (A) may contain various additives. Examples of such additives include antioxidants, plasticizers, heat stabilizers, ultraviolet absorbers, antistatic agents, lubricants, coloring agents, fillers, and other resins, and specific examples thereof are as follows. The content of these additives in the EVOH (A) is generally 10 mass % or less, suitably 5 mass % or less, more suitably 1 mass % or less.
Antioxidants: 2,5-di-t-butyl hydroquinone, 2,6-di-t-butyl-p-cresol, 4,4'-thiobis-(6-t-butylphenol), 2,2'-methylene-bis-(4-methyl-6-t-butylphenol), octadecyl-3-(3',5'-di-t-butyl-4'-hydroxyphenyl) propionate, 4,4'-thiobis-(6-t-butylphenol), and the like.
Ultraviolet absorbers: ethylene-2-cyano-3,3'-diphenyl acrylate, 2-(2'-hydroxy-5'-methylphenyl) benzotriazole, 2-(2'-hydroxy-5'-methylphenyl) benzotriazole, 2-(2'-hydroxy-5'-methylphenyl) benzotriazole, 2-(2'-hydroxy-3'-t-butyl-5'-methylphenyl)5-chlorobenzotriazole, 2-hydroxy-4-methoxybenzophenone, 2,2'-dihydroxy-4-methoxybenzophenone, 2-hydroxy-4-octoxybenzophenone, and the like.
Plasticizers: dimethyl phthalate, diethyl phthalate, dioctyl phthalate, waxes, liquid paraffins, phosphate esters, and the like.
Antistatic agents: pentaerythritol monostearate, sorbitan monopalmitate, sulfated polyolefins, polyethylene oxides, carbowaxes, and the like.
Lubricants: ethylenebisstearamide, butyl stearate, and the like.
Coloring agents: carbon black, phthalocyanine, quinacridone, indoline, azo pigments, colcothar, and the like.
Fillers: glass fibers, asbestos, wollastonite, calcium silicate, talc, montmorillonite, and the like.

The MFR (melt flow rate) of the EVOH (A) used in the present invention (measured at 210° C. under a load of 2160 g according to JIS K 7210) is suitably 1 to 18 g/10 min. In the case where the MFR of the EVOH (A) is over 18 g/10 min, the difference in melt viscosity between the EVOH (A) and the adhesive resin (B) and the difference in melt viscosity between the EVOH (A) and the high-density polyethylene (C) may possibly be excessively large. When the difference in melt viscosity is excessively large as above, the dispersibility of the EVOH (A) in the resin composition (D) layer is insufficient, and the foreign matter derived from the EVOH (A) may possibly increase. The MFR of the EVOH (A) is more suitably 10 g/10 min or less. Meanwhile, in the case where the MFR of the EVOH (A) is less than 1 g/10 min, the difference in melt viscosity between the EVOH (A) and the adhesive resin (B) may possibly be excessively large. The MFR of the EVOH (A) is more suitably 1.5 g/10 min or more.

The maleic anhydride-modified polyolefin used as the adhesive resin (B) can be obtained, for example, by graft modification of a polyolefin with maleic anhydride or copolymerization of an olefin with maleic anhydride. Examples of the maleic anhydride-modified polyolefin used as the adhesive resin (B) include maleic anhydride-modified products of polyethylenes [such as high-density polyethylene (HDPE), low-density polyethylene (LDPE), linear low-density polyethylene (LLDPE), and ultra-low-density polyethylene (VLDPE)], homo-polypropylene, random polypropylene, block polypropylene, ethylene-vinyl acetate copolymer, and ethylene-(meth)acrylic acid ester copolymer. Among these, maleic anhydride-modified products of high-density polyethylene, linear low-density polyethylene, and low-density polyethylene are suitable, and maleic anhydride-modified products of high-density polyethylene are particularly suitable.

The acid value of the maleic anhydride-modified polyolefin used as the adhesive resin (B) needs to be 0.1 to 10 mgKOH/g. This accelerates the reaction of the EVOH (A) with the adhesive resin (B) to improve the dispersibility of the EVOH (A) in the resin composition (D) layer. The improvement of the dispersibility of the EVOH (A) reduces the foreign matter derived from the EVOH (A) in the resin composition (D) layer when the production of the fuel container is continued over a long period of time and enables stable production of the fuel container. In the case where the acid value is less than 0.1 mgKOH/g, the dispersibility of the EVOH (A) is insufficient, and therefore the foreign matter increases. The acid value is suitably 0.5 mgKOH/g or more. Meanwhile, in the case where the acid value is over 10 mgKOH/g, the EVOH (A) easily deteriorates, and therefore the foreign matter increases. The acid value is suitably 6 mgKOH/g or less.

The maleic anhydride-modified polyolefin used as the adhesive resin (B) needs to contain 1 to 8.5 µmol/g of magnesium element, calcium element, zinc element, or a combination thereof. This suppresses the deterioration of the EVOH (A), thereby reducing the foreign matter derived from the EVOH (A) in the resin composition (D) when the production of the fuel container is continued over a long period of time. Accordingly, stable production of the fuel container is enabled. In the case where the total amount of magnesium element, calcium element, and zinc element in the adhesive resin (B) is less than 1 µmol/g, the EVOH (A) easily deteriorates, and therefore the foreign matter increases. The total amount is suitably 1.2 µmol/g or more. Meanwhile, in the case where the total amount of magnesium element, calcium element, and zinc element is over 8.5 µmol/g, degradation of the EVOH (A) proceeds to increase the difference in viscosity from the high-density polyethylene (C). Therefore, the degraded EVOH (A) is poorly dispersed in the resin composition (D) to form foreign matter. The total amount is suitably 6.5 µmol/g or less. Here, the molar ratio of magnesium element with respect to the total of magnesium element, calcium element, and zinc element in the adhesive resin (B) is more suitably 0.5 or more, further suitably 0.8 or more.

The forms of magnesium element, calcium element, and zinc element contained in the adhesive resin (B) are not specifically limited, and examples thereof include metal salts and metal oxides. Among these, metal salts are preferable. Examples of the metal salts include aliphatic carboxylates, aromatic carboxylates, phosphates, carbonates, sulfates, and silicates, and double salts also can be used as the metal salts. Among these, double salts and aliphatic carboxylates are preferable as the metal salts, and the former is more preferable. As the double salts, hydrotalcites are preferable, and specific examples thereof include those represented by the following formula.

In the formula, m represents one or more of Mg, Ca, and Zn, or a combination of one or more of Mg, Ca, and Zn with one or more of Sr, Ba, Cd, Pb, and Sn, b represents $CO_3$ or $HPO_4$, x, y, and z each represent a positive number, a represents 0 or a positive number, and $2x+3y-2z>0$.

Among hydrotalcites represented by the aforementioned formula, those with m being one or more of Mg, Ca, and Zn are preferable, and the following hydrotalcites are particularly suitable.

$$Mg_6Al_2(OH)_{16}CO_3 \cdot 4H_2O$$

$$Mg_8Al_2(OH)_{20}CO_3 \cdot 5H_2O$$

$$Mg_5Al_2(OH)_{14}CO_3 \cdot 4H_2O$$

$$Mg_{10}Al_2(OH)_{22}(CO_3)_2 \cdot 4H_2O$$

$$Mg_6Al_2(OH)_{16}HPO_4 \cdot 4H_2O$$

$$Ca_6Al_2(OH)_{16}CO_3 \cdot 4H_2O$$

$$Zn_6Al_2(OH)_{16}CO_3 \cdot 4H_2O$$

$$Mg_3ZnAl_2(OH)_{12}CO_3 \cdot 2.7H_2O$$

$$Mg_6Zn_2Al_2(OH)_{20}CO_3 \cdot 1.6H_2O$$

$$Mg_5Zn_{1.7}Al_{3.3}(OH)_{20}(CO_3)_{1.65} \cdot 4.5H_2O$$

Further, examples of the carboxylic acids constituting the aliphatic carboxylates include aliphatic carboxylic acids having 1 to 28 carbon atoms such as formic acid, acetic acid, propionic acid, butyric acid, lauric acid, stearic acid, myristic acid, behenic acid, and montanic acid.

In the adhesive resin (B), it is suitable that the content of aluminum element is 0.35 to 11.5 μmol/g, and the content of titanium element is 0.5 μmol/g or less. In the case where the content of aluminum element is less than 0.35 μmol/g, or the content of titanium element is over 0.5 μmol/g, the EVOH (A) easily deteriorates, and foreign matter in the resin composition (D) may possibly increase. The content of aluminum element is more suitably 1.5 μmol/g or more. Meanwhile, in the case where the content of aluminum element is over 11.5 μmol/g, compounds containing aluminum element form foreign matter due to aggregation or the like, and the impact resistance may possibly decrease. The content of aluminum element is more suitably 8 μmol/g or less, further suitably 5 μmol/g or less. Aluminum element can be contained in the adhesive resin (B) as hydrotalcites or the like. Further, titanium element may be contained in the adhesive resin (B) due to a catalyst or the like used in the production of the adhesive resin (B) remaining there in some cases.

As long as the effects of the present invention are not inhibited, the adhesive resin (B) may contain various additives. Examples of such additives can include antioxidants, plasticizers, heat stabilizers, ultraviolet absorbers, antistatic agents, lubricants, coloring agents, fillers, and other resins. Specific examples thereof include those described above as the additives used for the EVOH (A). The content of these additives in the adhesive resin (B) is generally 10 mass % or less, suitably 5 mass % or more suitably 1 mass % or less.

The MFR (melt flow rate) of the adhesive resin (B) (measured at 210° C. under a load of 2160 g according to JIS K 7210) is suitably 0.5 to 12 g/10 min. In the case where the MFR of the adhesive resin (B) is over 12 g/10 min, the difference in melt viscosity between the adhesive resin (B) and the high-density polyethylene (C) may possibly be excessively large. When the difference in melt viscosity is excessively large as above, the dispersibility of the EVOH (A) in the resin composition (D) layer is insufficient, and the foreign matter derived from the EVOH (A) may possibly increase. The MFR of the adhesive resin (B) is more suitably 10 g/10 min or less. Meanwhile, the MFR of the adhesive resin (B) is more suitably 1 g/10 min or more.

The high-density polyethylene (C) used in the present invention can be obtained, for example, by the low-pressure process or the medium-pressure process using a Ziegler catalyst. The density of the high-density polyethylene (C) is generally 0.92 g/cm³ or more, suitably 0.93 g/cm³ or more. In the case where the density is less than 0.92 g/cm³, the fuel barrier properties and the rigidity of the fuel container are insufficient. The density of the high-density polyethylene (C) is generally 1.00 g/cm³ or less.

The total amount of magnesium element, calcium element, and zinc element in the high-density polyethylene (C) is suitably 0.5 μmol/g or less. In the case where the total amount is over 0.5 μmol/g, the foreign matter derived from the EVOH (A) in the resin composition (D) may possibly increase. The total amount is more suitably 0.3 μmol/g or less.

As long as the effects of the present invention are not inhibited, the high-density polyethylene (C) may contain various additives. Examples of such additives can include antioxidants, plasticizers, heat stabilizers, ultraviolet absorbers, antistatic agents, lubricants, coloring agents, fillers, and other resins, and specific examples thereof include those described above as the additives used for the EVOH (A). The content of these additives in the high-density polyethylene (C) is generally 10 mass % or less, suitably 5 mass % or less, more suitably 1 mass % or less.

The MFR (melt flow rate) of the high-density polyethylene (C) (measured at 210° C. under a load of 2160 g according to JIS K 7210) is suitably 0.01 to 0.3 g/10 min. In the case where the MFR of the high-density polyethylene (C) is less than 0.01 g/10 min, the difference in melt viscosity between the EVOH (A) and the high-density polyethylene (C) and the difference in melt viscosity between the adhesive resin (B) and the high-density polyethylene (C) may possibly be excessively large. When the difference in melt viscosity is excessively large as above, the dispersibility of the EVOH (A) in the resin composition (D) layer is insufficient, and the foreign matter derived from the EVOH (A) may possibly increase. The MFR of the high-density polyethylene (C) is more suitably 0.03 g/10 min or more. Meanwhile, in the case where the MFR of the high-density polyethylene (C) is over 0.3 g/10 min, the formability may decrease in some cases. The MFR of the EVOH (A) is more suitably 0.2 g/10 min or less.

The EVOH (A), the adhesive resin (B), and the high-density polyethylene (C) used for the fuel container of the present invention need to satisfy formulas (1) to (2) below.

$$0.05 \leq Ma/Mb \leq 40 \quad (1)$$

$$Ma/Mc \leq 1800 \quad (2)$$

In formulas (1) and (2) above, Ma, Mb, and Mc are respectively as follows: Ma represents the MFR (g/10 min) of the EVOH (A) (measured at 210° C. under a load of 2160 g); Mb represents the MFR (g/10 min) of the adhesive resin (B) (measured at 210° C. under a load of 2160 g); and Mc represents the MFR (g/10 min) of the high-density polyethylene (C) (measured at 210° C. under a load of 2160 g).

In the case where the Ma/Mb in formula (1) above is less than 0.05 or over 40, the dispersibility of the EVOH (A) in the resin composition (D) layer is insufficient, and the foreign matter derived from the EVOH (A) increases. The Ma/Mb is suitably 0.5 or more. Meanwhile, the Ma/Mb is suitably 20 or less, more suitably 8 or less.

In formula (2) above, Ma/Mc is 2 or more. The high-density polyethylene has a high melt viscosity, and there is a large difference in melt viscosity between the high-density polyethylene and the EVOH. Therefore, in the case where the high-density polyethylene and the EVOH are melt-kneaded, the EVOH tends to be poorly dispersed. When the dispersion of the EVOH is poor, foreign matter derived from the EVOH occurs. Meanwhile, the EVOH (A) is sufficiently dispersed in the resin composition (D) in the present invention, even in the case where the difference in melt viscosity between the high-density polyethylene (C) having a high melt viscosity and the EVOH (A) is large as above. Accordingly, the foreign matter derived from the EVOH (A) is reduced. Ma/Mc is suitably 10 or more. Meanwhile, in the case where Ma/Mc is over 1800, the difference in melt viscosity between the EVOH (A) and the high-density polyethylene (C) is excessively large, and the dispersibility of the EVOH (A) in the resin composition (D) layer is insufficient, so that foreign matter increases. Ma/Mc is suitably 1500 or less.

The adhesive resin (B) and the high-density polyethylene (C) used for the fuel container of the present invention suitably satisfy formula (8) below.

$$2 \leq Mb/Mc \leq 1000 \tag{8}$$

In formula (8) above, Mb and Mc are the same as in formulas (1) and (2) above.

In the case where Mb/Mc in formula (8) above is over 1000, the difference in melt viscosity between the adhesive resin (B) and the high-density polyethylene (C) may possibly be excessively large. When the difference in melt viscosity is excessively large, the dispersibility of the EVOH (A) in the resin composition (D) layer is insufficient, and the foreign matter derived from the EVOH (A) may possibly increase. Meanwhile, the Mb/Mc is more suitably 10 or more.

The resin composition (D) used in the present invention contains the EVOH (A), the adhesive resin (B), and the high-density polyethylene (C).

The content of the EVOH (A) in the resin composition (D) is suitably 1 to 20 mass %. In the case where the content of the EVOH (A) is less than 1 mass %, the usage ratio of recovered materials may possibly decrease. Meanwhile, in the case where the content of the EVOH (A) is over 20 mass %, the impact resistance may possibly decrease.

The content of the adhesive resin (B) in the resin composition (D) is suitably 1 to 20 mass %. In the case where the content of the adhesive resin (B) is less than 1 mass %, the dispersibility of the EVOH (A) decreases, and the foreign matter derived from the EVOH (A) in the resin composition (D) may possibly increase. Meanwhile, in the case where the content of the adhesive resin (B) is over 20 mass %, the reaction of the EVOH (A) with the adhesive resin (B) excessively proceeds, and the foreign matter may possibly increase. The content of the adhesive resin (B) is more suitably 15 mass % or less.

The content of the high-density polyethylene (C) in the resin composition (D) is suitably 60 to 98 mass %. In the case where the content of the high-density polyethylene (C) is less than 60 mass %, the impact resistance may possibly decrease. Meanwhile, in the case where the content of the high-density polyethylene (C) is over 98 mass %, the usage ratio of recovered materials may possibly decrease. The high-density polyethylene (C) is more suitably 95 mass % or less.

Due to the contents of the EVOH (A), the adhesive resin (B), and the high-density polyethylene (C) in the resin composition (D) falling within the aforementioned ranges, the foreign matter derived from the EVOH (A) further decreases, and further stable production of the fuel container is enabled.

It is suitable that the resin composition (D) contains 0.001 to 1 µmol/g of magnesium element, calcium element, zinc element, or a combination thereof. This further suppresses the deterioration of the EVOH (A), and therefore the foreign matter derived from the EVOH (A) in the resin composition (D) is further reduced when the production of the fuel container is continued over a long period of time. Accordingly, further stable production of the fuel container is enabled. The total amount of magnesium element, calcium element, and zinc element is more suitably 0.1 µmol/g or more. Meanwhile, the total amount of magnesium element, calcium element, and zinc element is more suitably 0.6 µmol/g or less, further suitably 0.4 µmol/g or less.

It is also suitable that the resin composition (D) contains 0.001 to 5 µmol/g of alkali metal elements. This accelerates the reaction of the EVOH (A) with the adhesive resin (B), and the dispersibility of the EVOH (A) in the resin composition (D) layer is further improved. This further reduces the foreign matter derived from the EVOH (A) when the production of the fuel container is continued over a long period of time, and further stable production of the fuel container is enabled. In the case where the content of alkali metal elements in the resin composition (D) is less than 0.001 µmol/g, the aforementioned effects cannot be obtained. The content of alkali metal elements is more suitably 0.2 µmol/g or more. Meanwhile, in the case where the content of alkali metal elements is over 5 µmol/g, the EVOH (A) easily deteriorates, and the foreign matter may possibly increase. The content of alkali metal elements is more suitably 2 µmol/g or less.

As long as the effects of the present invention are not inhibited, the resin composition (D) may contain various additives. Examples of such additives can include antioxidants, plasticizers, heat stabilizers, ultraviolet absorbers, antistatic agents, lubricants, coloring agents, fillers, and resins other than the EVOH (A), the adhesive resin (B), and the high-density polyethylene (C), and specific examples thereof include those described above as the additives used for the EVOH (A). The content of these additives in the resin composition (D) is generally 10 mass % or less, suitably 5 mass % or less, more suitably 1 mass % or less.

As the raw materials of the resin composition (D), only unused resins may be used, but recovered materials such as scraps, e.g., burrs generated during production of the fuel container of the present invention and rejected items during molding are preferably used as at least a part of the raw materials.

This reduces the amount of waste and therefore is therefore preferable in view of the environmental protection, and the cost reduction effect also can be obtained. The amount of the recovered materials in the resin composition (D) is suitably 50 mass % or more.

The fuel container of the present invention is composed of a multilayer structure containing the EVOH (A) layer, the adhesive resin (B) layer, the high-density polyethylene (C) layer, and the resin composition (D) layer. Examples of the multilayer structure include the following layer structures.

In these examples, the left side represents the inner side of the fuel container, and the right side represents the outer side thereof.

Five layers: (inner side) C/B/NB/D (outer side) and D/B/NB/C

Six layers: (inner side) C/B/A/B/D/C (outer side), C/D/B/A/B/C, D/C/B/NB/C, C/D/B/A/B/D, D/C/B/NB/D, C/B/A/B/C/D, D/B/A/B/D/C, and D/B/NB/C/D Seven layers: (inner side) C/D/B/A/B/D/C (outer side), C/D/B/A/B/C/D, D/C/B/A/B/C/D, and D/C/B/A/B/D/C However, the layer structure is not limited to the aforementioned examples. Among these, (inner side) C/B/NB/D/C (outer side) and (inner side) C/D/B/A/B/D/C (outer side) are suitable, and the former is more suitable. Further, the EVOH (A) layer and the adhesive resin (B) layer are suitably in contact with each other in the multilayer structure. This improves the adhesiveness between layers constituting the multilayer structure, therefore improving the mechanical strength of the fuel container.

The thickness of the EVOH (A) layer (thickness per layer) is suitably 20 to 300 μm. In the case where the thickness of the EVOH (A) layer is less than 20 μm, the fuel barrier properties may possibly be insufficient. Meanwhile, in the case where the thickness of the EVOH (A) layer is over 300 μm, the impact resistance may possibly decrease, or the cost may possibly be high.

The thickness of the adhesive resin (B) layer (thickness per layer) is suitably 4 to 300 μm. In the case where the thickness of the adhesive resin (B) layer is less than 4 μm, the dispersibility of the EVOH (A) is insufficient, and foreign matter may possibly increase, when recovered materials are used as raw materials of the resin composition (D). The thickness of the adhesive resin (B) layer is more suitably 7 μm or more. Meanwhile, in the case where the thickness of the adhesive resin (B) layer is over 300 μm, the reaction of the EVOH (A) with the adhesive resin (B) excessively proceeds, and foreign matter may possibly increase, when recovered materials are used as raw materials of the resin composition (D). The thickness of the adhesive resin (B) layer is more suitably 250 μm or less.

The thickness of the high-density polyethylene (C) layer (thickness per layer) is suitably 300 to 3000 μm. In the case where the thickness of the high-density polyethylene (C) layer is less than 300 μm, the impact resistance may possibly decrease. The thickness of the high-density polyethylene (C) layer is more suitably 350 μm or more. Meanwhile, in the case where the thickness of the high-density polyethylene (C) layer is over 3000 μm, the fuel container may possibly be excessively heavy, and the cost may possibly be high. The thickness of the adhesive resin (B) layer is more suitably 2500 μm or less.

The thickness of the resin composition (D) layer (thickness per layer) is suitably 100 to 20000 μm. In the case where the thickness of the resin composition (D) layer is less than 100 μm, the cost may possibly be high. The thickness of the resin composition (D) layer is suitably 200 μm or more. Meanwhile, in the case where the thickness of the resin composition (D) layer is over 20000 μm, the impact resistance may possibly decrease. The thickness of the resin composition (D) layer is suitably 10000 μm or less.

The overall thickness of the multilayer structure constituting the fuel container of the present invention can be appropriately set corresponding to the volume and the application. The overall thickness is generally 500 to 50000 μm. In the case where the overall thickness is less than 500 μm, the mechanical strength of the fuel container may possibly be insufficient. The overall thickness is suitably 1000 μm or more. Meanwhile, in the case where the overall thickness is over 50000 μm, the fuel container may possibly be excessively heavy, and the cost may possibly be high. The overall thickness is suitably 8500 μm or less, more suitably 7000 μm or less.

In the present invention, the thickness of each layer and the overall thickness of the multilayer structure can be determined by measuring the cross section of the body of the fuel container. Specifically, they are average values obtained by cutting the container in a direction rectangular to the flow direction, measuring the cross section of the entire circumference of the cut surface at 30 random points, and thereafter subtracting the average values ±1σ from the obtained values.

The fuel container of the present invention needs to satisfy formulas (3) to (6) below.

$$0.003 \leq Ta/Tt \leq 0.12 \quad (3)$$

$$0.0015 \leq Tb/Tt \leq 0.12 \quad (4)$$

$$0.83 \leq (Tc+Td)/Tt \leq 0.99 \quad (5)$$

$$0.02 \leq Td/(Tc+Td) \leq 0.90 \quad (6)$$

In formulas (3) to (6) above, Ta represents the total thickness of the (A) layer, Tb represents the total thickness of (B) layer, Tc represents the total thickness of the (C) layer, Td represents the total thickness of the (D) layer, and Tt represents the overall thickness (Ta+Tb+Tc+Td).

In the case where Ta/Tt in formula (3) above is less than 0.003, the fuel barrier properties may possibly decrease. Ta/Tt is suitably 0.008 or more. Meanwhile, in the case where Ta/Tt is over 0.12, the impact resistance decreases. Ta/Tt is suitably 0.10 or less.

In the case where Tb/Tt in formula (4) above is less than 0.0015, the dispersibility of the EVOH (A) is insufficient, and the foreign matter derived from the EVOH (A) increases, when recovered materials are used as raw materials of the resin composition (D). Tb/Tt is suitably 0.004 or more. Meanwhile, in the case where Tb/Tt is over 0.12, the reaction of the EVOH (A) with the adhesive resin (B) excessively proceeds, and foreign matter may possibly increase in some cases, when recovered materials are used as raw materials of the resin composition (D).

In formula (5) above, (Tc+Td)/Tt indicates the ratio of the total thickness of the high-density polyethylene (C) layer and the resin composition (D) layer with respect to the overall thickness of the fuel container. In the case where (Tc+Td)/Tt is less than 0.83, the impact resistance decreases. Meanwhile, in the case where (Tc+Td)/Tt is over 0.99, the fuel barrier properties may possibly decrease.

In formula (6) above, Td/(Tc+Td) indicates the ratio of the total thickness of the resin composition (D) layer with respect to the total thickness of the high-density polyethylene (C) layer and the resin composition (D) layer. In the case where Td/(Tc+Td) is less than 0.02, the cost is high. Td/(Tc+Td) is suitably 0.2 or more. Meanwhile, in the case where Td/(Tc+Td) is over 0.90, the impact resistance decreases. Td/(Tc+Td) is suitably 0.83 or less.

It is suitable that the fuel container of the present invention satisfies formula (9) below.

$$0.02 \leq Ta/Tb \leq 40 \quad (9)$$

In formula (9) above, Ta and Tb are the same as in formulas (3) and (4) above.

In formula (9) above, in the case where Ta/Tb is less than 0.02, the reaction of the EVOH (A) with the adhesive resin (B) excessively proceeds, and foreign matter may possibly increase, when recovered materials are used as raw materials of the resin composition (D). Meanwhile, in the case where Ta/Tb is over 40, the dispersibility of the EVOH (A) decreases, and foreign matter may possibly increase, when recovered materials are used as raw materials of the resin composition (D).

It is suitable that the fuel container of the present invention satisfies formula (7) below.

$$0.3 \leq (VA \times Ta)/(MT \times Tb) \leq 1000 \qquad (7)$$

In formula (7) above, VA, MT, Ta, and Tb are respectively as follows: VA represents a vinyl alcohol content (mol %) in the ethylene-vinyl alcohol copolymer (A); MT represents the total amount (μmol/g) of magnesium element, calcium element, and zinc element in the adhesive resin (B); Ta represents the total thickness (μm) of the EVOH (A) layer; and Tb represents the total thickness (μm) of the adhesive resin (B) layer.

In the case where (VA×Ta)/(MT×Tb) in formula (7) above is less than 0.3, the total number of moles of magnesium element, calcium element, and zinc element with respect to the number of moles of vinyl alcohol units in the resin composition (D) may possibly be excessively large, when recovered materials are used as raw materials of the resin composition (D). Therefore, the reaction of the EVOH (A) with the adhesive resin (B) excessively proceeds, and foreign matter may possibly increase. (VA×Ta)/(MT×Tb) is suitably 0.5 or more. Meanwhile, in the case where (VA×Ta)/(MT×Tb) is over 1000, the total number of moles of magnesium element, calcium element, and zinc element with respect to the number of moles of vinyl alcohol units in the resin composition (D) may possibly be excessively small, when recovered materials are used as raw materials of the resin composition (D). Therefore, the dispersibility of the EVOH (A) decreases, and foreign matter may possibly increase. (VA×Ta)/(MT×Tb) is suitably 400 or less.

The method for producing the fuel container of the present invention is not specifically limited. Examples thereof can include forming methods that are generally used in the field of polyolefins, such as extrusion molding, blow molding, injection molding, and thermoforming. Among these, blow molding and thermoforming are suitable, coextrusion blow molding and coextrusion sheet thermoforming are particularly suitable, and the former is optimal.

In the case of producing the fuel container by blow molding, any method of coextrusion blow molding and coinjection blow molding can be employed, but coextrusion blow molding, which enables easy formation of complex shapes of containers, is suitable. In coextrusion blow molding, a parison is formed by melt extrusion, the parison is sandwiched by a pair of blow molding dies, so that the parison is cut off while the cut-off portions facing each other are fused. The parison that has been cut off is then formed into a container by being expanded in the mold. However, in the case of large-size containers such as fuel tanks for automobiles, the parison is sandwiched between the dies, and pressure bonding is performed, but it is not cut off in the dies, and the portion protruding from the surface of the container is usually cut off with a cutter or the like at any height.

Further, the die temperature for blow molding the fuel container of the present invention is suitably 5 to 30° C., more preferably 10 to 30° C., further preferably 10 to 20° C. In the case where the die temperature is less than 5° C., condensation tends to occur on the die surfaces, and the appearance of molded products may possibly be poor. Meanwhile, in the case where the die temperature is over 30° C., the productivity may possibly decrease due to an increase in the time to cool the resin, and in the case where the resin cannot be sufficiently cooled, distortion may possibly occur in molded products.

The obtained molded products and container precursors such as a parison and sheets in the course of molding may be subjected to crosslinking by irradiation with radiation or the like.

The fuel container in the present invention means fuel containers mounted on automobiles, motorcycles, ships, aircrafts, power generators, and industrial and agricultural equipment, or portable containers for supplying fuel to these fuel containers, and further containers for storing fuel used for operating these appliances. Further, typical examples of the fuel include regular gasoline, methanol, ethanol, gasoline blending toluene, MTBE, or the like and biodiesel fuel, and the examples also include heavy oil, light oil, and kerosene other than above.

EXAMPLES

Hereinafter, the present invention will be further specifically described by way of Examples.

[Ethylene Content and Saponification Degree of EVOH]

After the EVOH was dissolved in DMSO-d6, the solution obtained was subjected to $^1$H-NMR measurement using a nuclear magnetic resonance apparatus "JNM-GX-500", manufactured by JEOL Ltd., to determine the ethylene content and the saponification degree of the EVOH.

[Content of Metal Elements]

After 5 mL of concentrated nitric acid was added to 0.5 g of the collected resin, the mixture was degraded using a wet decomposition apparatus "MWS-2", manufactured by ACTAC Project Services Corporation, to obtain a resin degradation solution. The resin degradation solution was measured using an ICP emission spectrometer ("OPTIMA4300DV" manufactured by PerkinElmer, Inc.), thereby determining the amount of metals in the resin.

[MFR]

The MFR of the resin was measured at 210° C. under a load of 2160 g based on JIS K 7210.

[Acid Value of Adhesive Resin]

The acid value of the adhesive resin was determined based on the neutralization titration method of JIS K 0070. Xylene was used as a solvent.

[EVOH]

Production of EVOH (A1)

100 parts by mass of aqueous pellets (moisture content: 50%) composed of an EVOH with an ethylene content of 32 mol % and a saponification degree of 99.99% was immersed in 400 parts by mass of an aqueous solution containing 0.02 g/L of magnesium acetate, 0.025 g/L of sodium acetate, and 0.1 g/L of potassium acetate at 25° C. for 6 hours. After dewatering, drying was performed, to obtain pellets of the EVOH (A1). Table 1 shows the ethylene content, the saponification degree, the MFR, and the content of metals (Mg, K, and Na) of the EVOH (A1).

Production of EVOHs (A2 to A16)

EVOHs (A2 to A14) were produced in the same manner as in the EVOH (A1) except that the type of the ethylene-vinyl acetate copolymer used and the amount of the additive used were changed. Further, EVOHs (A15 and A16) were produced in the same manner as in the EVOH (A1) except that the type of the additive used was changed (from magnesium acetate to zinc acetate or calcium acetate). Table 1 shows the ethylene content, the saponification degree, the MFR, and the content of metals (Mg, Zn, Ca, K, and Na) of the EVOHs (A2 to A16).

[High-Density Polyethylenes]

High-density polyethylenes (C1) to (C4) shown in Table 5 were used. Table 3 shows the density, the MFR, and the content of metal (Mg) of (C1) to (C4).

TABLE 3

| Type | C1 | C2 | C3 | C4 |
|---|---|---|---|---|
| Mg (µmol/g) | 0 | 0.5 | 0 | 0 |
| Density (g/cm$^3$) | 0.950 | 0.950 | 0.950 | 0.950 |
| MFR (210° C., 2160 g) | 0.07 | 0.07 | 0.01 | 0.3 |

TABLE 1

| Type | A1 | A2 | A3 | A4 | A5 | A6 | A7 | A8 | A9 | A10 | A11 | A12 | A13 | A14 | A15 | A16 |
|---|---|---|---|---|---|---|---|---|---|---|---|---|---|---|---|---|
| Content of ethylene (mol %) | 32 | 27 | 27 | 24 | 15 | 38 | 44 | 32 | 32 | 32 | 32 | 48 | 32 | 32 | 32 | 32 |
| Degree of saponification (mol %) | 99.9 | 99.7 | 99.6 | 99.8 | 99.6 | 99.8 | 99.9 | 99.7 | 99.7 | 99.9 | 99.9 | 99.7 | 99.9 | 99.7 | 99.9 | 99.9 |
| Mg (µmol/g) | 1.6 | 0 | 1.6 | 0 | 0 | 0 | 0 | 1.6 | 1.6 | 1.6 | 1.6 | 0 | 1.6 | 1.6 | 0.6 [1] | 1.0 [2] |
| K (µmol/g) | 1.3 | 0 | 0 | 0 | 0 | 0 | 0 | 0 | 0 | 1.3 | 1.3 | 1.3 | 1.3 | 1.3 | 1.3 | 1.3 |
| Na (µmol/g) | 8.7 | 7.0 | 7.0 | 8.7 | 8.7 | 8.7 | 8.7 | 8.7 | 8.7 | 8.7 | 8.7 | 8.7 | 8.7 | 8.7 | 8.7 | 8.7 |
| K+ Na (µmol/g) | 10.0 | 7.0 | 7.0 | 8.7 | 8.7 | 8.7 | 8.7 | 8.7 | 8.7 | 10.0 | 10.0 | 10.0 | 10.0 | 10.0 | 10.0 | 10.0 |
| MFR (210° C., 2160 g) | 3.8 | 4.0 | 3.4 | 2.2 | 3.6 | 3.8 | 3.6 | 1 | 17 | 1 | 17 | 3.6 | 22 | 0.5 | 3.8 | 3.8 |

[1] Zn content derived from zinc acetate
[2] Ca content derived from calcium acetate

[Adhesive Resin]

Production of Maleic Anhydride-Modified Polyolefin (B1)

100 parts by mass of a maleic anhydride graft-modified high-density polyethylene [with a density of 0.945 g/cm$^3$, a MFR (measured at 210° C. under a load of 2160 g) of 1.8 g/10 minute, and an acid value of 2.8 mgKOH/g] and 0.0007 part by weight of a hydrotalcite ("DHT-4A" manufactured by Kyowa Chemical Industry Co., Ltd.) were melt-kneaded by an extruder (at a set temperature of 230° C.), to obtain a maleic anhydride-modified polyolefin (B1). Table 2 shows the acid value, the MFR, and the content of metals (Mg, Al, and Ti) of (B1).

Production of Maleic Anhydride-Modified Polyolefins (B2 to B17)

Pellets of maleic anhydride modified high density polyolefins (B2 to B17) were produced in the same manner as in (A1) except that the types and the amounts of the maleic anhydride graft-modified polyethylene and the hydrotalcite used were changed. Table 3 shows the acid value, the MFR, and the content of metals (Mg, Zn, Ca, Al, and Ti) of (B2) to (B17).

Example 1

[Fabrication of Pellets of Resin Composition (D)]

A container that is the same as below except for not containing the resin composition (D) layer was fabricated, and pellets of the resin composition (D) were fabricated using the container. Hereinafter, a specific description will be given. Using A1 as the EVOH (A), B1 as the adhesive resin (B), and C1 as the high-density polyethylene (C), a three-material, five-layer parison of (inner side) C/B/A/B/C (outer side) were extruded at 210° C. using a blow molding machine "TB-ST-6P" manufactured by Suzuki Tekkosho, followed by blowing within dies at 15° C. and cooling for 20 seconds, to mold a 500-ml container (with a diameter at the bottom of 100 mm and a height of 64 mm) having a total layer thickness of 3300 µm [(inner side) C/B/NB/C (outer side)=1500/100/100/100/1500 µm].

The obtained container was crushed and thereafter was melt-extruded to obtain pellets of the resin composition (D).

TABLE 2

| Type | B1 | B2 | B3 | B4 | B5 | B6 | B7 | B8 | B9 | B10 | B11 | B12 | B13 | B14 | B15 | B16 | B17 |
|---|---|---|---|---|---|---|---|---|---|---|---|---|---|---|---|---|---|
| Acid value (mgKOH/g) | 2.8 | 0.1 | 10 | 2.8 | 2.8 | 2.8 | 2.8 | 2.8 | 2.8 | 2.8 | 2.8 | 0.05 | 12 | 2.8 | 2.8 | 2.8 | 2.8 |
| Mg (µmol/g) | 3.3 | 3.3 | 3.3 | 1.0 | 8.2 | 3.3 | 3.3 | 3.3 | 3.3 | 3.3 | 3.3 | 3.3 | 3.3 | 0.4 | 10.3 | 1.2 [1] | 2.0 [2] |
| Al (µmol/g) | 3.7 | 3.7 | 3.7 | 1.2 | 9.3 | 3.7 | 3.7 | 3.7 | 3.7 | 3.7 | 3.7 | 3.7 | 3.7 | 0.5 | 11.6 | 3.7 | 3.7 |
| Ti (µmol/g) | 0.05 | 0.05 | 0.05 | 0.05 | 0.05 | 0.00 | 0.42 | 0.05 | 0.05 | 0.05 | 0.05 | 0.05 | 0.05 | 0.05 | 0.05 | 0.05 | 0.05 |
| Density (g/cm$^3$) | 0.945 | 0.945 | 0.945 | 0.945 | 0.945 | 0.945 | 0.945 | 0.945 | 0.945 | 0.945 | 0.945 | 0.945 | 0.945 | 0.945 | 0.945 | 0.945 | 0.945 |
| MFR (210° C, 2160 g) | 1.8 | 1.8 | 1.8 | 1.8 | 1.8 | 1.8 | 1.8 | 0.5 | 10 | 0.3 | 15.0 | 1.8 | 1.8 | 1.8 | 1.8 | 1.8 | 1.8 |

[1] Zn content ("STABIACE HT-7" manufactured by SAKAI CHEMICAL INDUSTRY CO., LTD. was used as a hydrotalcite)
[2] Ca content ("C-13" manufactured by Katsuta Kako Co., Ltd. was used as carbonated hydrocalumite)

The content of metal elements in the resin composition (D) obtained was measured by the aforementioned method. Table 4 shows the results.

[Fabrication of Container]

Using A1 as the EVOH (A), B1 as the adhesive resin (B), C1 as the high-density polyethylene (C), and the aforementioned pellets as the resin composition (D), a four-material, six-layer parison of (inner side) C/B/NB/D/C (outer side) were extruded at 210° C. using a blow molding machine "TB-ST-6P" manufactured by Suzuki Tekkosho, followed by blowing within dies at 15° C. and cooling for 20 seconds, to mold a 500-ml container (with a diameter at the bottom of 100 mm and a height of 64 mm) having a total layer thickness of 5100 μm [(inner side) C/B/NB/D/C (outer side)=1500/100/100/100/1800/1500 μm]. The thickness of each layer was determined by the aforementioned method. Table 4 also shows the type of the resin and the thickness of each layer used. The fuel barrier properties of the container obtained were evaluated. [Evaluation of fuel barrier properties]

300 ml of [a mixture at a ratio of toluene (50 mass %):isooctane (50 mass %)] was put into the container obtained above and was completely sealed so as not to leak, which was allowed to stand in an atmosphere of 20° C. and 65% RH, to determine the decrease in bottle mass (the average of n=6) after a lapse of 4 days. Table 4 shows the results.

[Evaluation of Impact Resistance (Multilayer Container)]

The obtained multilayer container was filled with water and was dropped from a height of 6 m onto a concrete so that the corner at the bottom collides therewith with n=10, which was evaluated according to the following criteria. Table 4 shows the results.

A: No damage
B: Partially whitened
C: Cracks occurred
D: Broken

[Evaluation of Impact Resistance (Single Layer of Resin Composition (D))]

The obtained container was crushed and thereafter was melt-extruded to obtain recycled pellets. The recycled pellets were subjected to extrusion blow molding to mold a 500-ml single-layer container (with a diameter at the bottom of 100 mm, a height of 64 mm, and a thickness of 5000 μm). The obtained container was filled with water and was dropped from a height of 6 m onto a concrete, which was evaluated according to the following criteria. Table 4 shows the results.

A: No damage
B: Partially whitened
C: Cracks occurred
D: Broken

[Evaluation of Amount of Foreign Matter]

75 g of the recycled pellets was put into a roller mixer ("R100" manufactured by Toyo Seiki Seisaku-sho, Ltd.), followed by stirring at 240° C. and 100 rpm for 2 hours. After stopping the stirring, the resin composition was taken out, and a high-density polyethylene ("MIRASON 16P" manufactured by Japan Polyethylene Corporation) was put into a roller mixer ("R100" manufactured by Toyo Seiki Seisaku-sho, Ltd.), followed by stirring at 240° C. and 100 rpm for 10 minutes. After stopping the stirring, the resin composition was taken out, and the resin (foreign matter) adhering to the inside of the mixer was collected and weighed. Table 4 shows the results.

[Oxygen Transmission Rate (OTR) of EVOH Single-Layer Film]

Using A1 as the EVOH (A), a film was formed under the following conditions to obtain a single layer film having the same thickness as the EVOH (A) layer in the aforementioned fuel container.

Apparatus: 20-mm diameter single screw extruder ("Labo Prastom ill 4M150" manufactured by Toyo Seiki Seisaku-sho, Ltd.)
L/D: 20
Screw: Full flight
Dies: 300-mm coat hanger dies
Extrusion temperature: C1=180° C., C2 to C3=220° C., and die=220° C.
Screen: 50/100/50
Cooling roll temperature: 40° C.

After the obtained single layer film was humidified under conditions of 20° C. and 65% RH, the oxygen transmission rate (OTR) was measured using an oxygen transmission rate measuring device ("OX-Tran2/20" manufactured by Modern Controls Inc.) under conditions of 20° C. and 65% RH according to the method of JIS-K7126 (isopiestic method).

Examples 2 to 36 and Comparative Examples 1 to 13

Containers were fabricated and evaluated in the same manner as in Example 1 except that the thickness of each layer and the type of the resin used were changed to the values shown in Tables 4 to 6. Further, recycled pellets, containers for evaluating the impact resistance, EVOH single layer films were fabricated and evaluated in the same manner as in Example 1.

TABLE 4

|   |   | Example 1 | Example 2 | Example 3 | Example 4 | Example 5 | Example 6 | Example 7 | Example 8 |
|---|---|---|---|---|---|---|---|---|---|
| A | Type | A1 | A2 | A3 | A4 | A5 | A6 | A7 | A8 |
|   | Thickness (μm) | 100 | 100 | 100 | 100 | 100 | 100 | 100 | 100 |
| B | Type | B1 | B1 | B1 | B1 | B1 | B1 | B1 | B1 |
|   | Thickness (μm) | 100 | 100 | 100 | 100 | 100 | 100 | 100 | 100 |
| C | Type | C1 | C1 | C1 | C1 | C1 | C1 | C1 | C1 |
|   | Thickness (μm) | 1500 | 1500 | 1500 | 1500 | 1500 | 1500 | 1500 | 1500 |
| D | A (mass %) | 3.8 | 3.8 | 3.8 | 3.9 | 4.0 | 3.7 | 3.6 | 3.8 |
|   | B (mass %) | 6.0 | 6.0 | 6.0 | 6.0 | 6.0 | 6.0 | 6.0 | 6.0 |
|   | C (mass %) | 90.2 | 90.2 | 90.2 | 90.1 | 90.0 | 90.3 | 90.4 | 90.2 |
|   | Mg (μmol/g) | 0.26 | 0.20 | 0.26 | 0.20 | 0.20 | 0.20 | 0.20 | 0.26 |
|   | K + Na (μmol/g) | 0.38 | 0.26 | 0.26 | 0.34 | 0.35 | 0.32 | 0.31 | 0.33 |

TABLE 4-continued

|  |  |  |  |  |  |  |  |  |  |
|---|---|---|---|---|---|---|---|---|---|
|  | Al (ppm) | 6.0 | 6.0 | 6.0 | 6.0 | 6.0 | 6.0 | 6.0 | 6.0 |
|  | Ti (ppm) | 0.14 | 0.14 | 0.14 | 0.14 | 0.14 | 0.14 | 0.14 | 0.14 |
|  | Ta/Tb | 0.5 | 0.5 | 0.5 | 0.5 | 0.5 | 0.5 | 0.5 | 0.5 |
|  | Thickness (μm) | 1800 | 1800 | 1800 | 1800 | 1800 | 1800 | 1800 | 1800 |
| Ta/Tt |  | 0.020 | 0.020 | 0.020 | 0.020 | 0.020 | 0.020 | 0.020 | 0.020 |
| Tb/Tt |  | 0.039 | 0.039 | 0.039 | 0.039 | 0.039 | 0.039 | 0.039 | 0.039 |
| (Tc + Td)/Tt |  | 0.94 | 0.94 | 0.94 | 0.94 | 0.94 | 0.94 | 0.94 | 0.94 |
| Td/(Tc + Td) |  | 0.38 | 0.38 | 0.38 | 0.38 | 0.38 | 0.38 | 0.38 | 0.38 |
| Ma/Mb |  | 2.1 | 2.2 | 1.9 | 1.2 | 2.0 | 2.1 | 2.0 | 0.56 |
| Ma/Mc |  | 54 | 57 | 49 | 31 | 51 | 54 | 51 | 14 |
| Ta/Tb |  | 0.50 | 0.50 | 0.50 | 0.50 | 0.50 | 0.50 | 0.50 | 0.50 |
| (VA × Ta)/(MT × Tb) |  | 4.9 | 4.1 | 4.1 | 3.6 | 2.3 | 5.8 | 6.7 | 4.9 |
| Amount of foreign matter (g) |  | 0.3 | 0.5 | 0.3 | 0.4 | 0.4 | 0.4 | 0.4 | 0.3 |
| Oxygen transmission rate (cc, μm/m², day) |  | 0.08 | 0.04 | 0.04 | 0.02 | 0.01 | 0.30 | 0.40 | 0.08 |
| Fuel permeation amount (g) |  | 0.31 | 0.16 | 0.16 | 0.11 | 0.03 | 0.67 | 1.44 | 0.31 |
| Impact resistance (multilayer) |  | A | A | A | A | A | A | A | A |
| Impact resistance (D single layer) |  | A | A | A | A | A | A | A | A |

|  |  | Example 9 | Example 10 | Example 11 | Example 12 | Example 13 | Example 14 | Example 15 | Example 16 |
|---|---|---|---|---|---|---|---|---|---|
| A | Type | A9 | A1 | A1 | A1 | A1 | A1 | A1 | A1 |
|  | Thickness (μm) | 100 | 20 | 300 | 100 | 100 | 100 | 100 | 100 |
| B | Type | B1 | B1 | B1 | B2 | B3 | B4 | B5 | B6 |
|  | Thickness (μm) | 100 | 100 | 100 | 100 | 100 | 100 | 100 | 100 |
| C | Type | C1 | C1 | C1 | C1 | C1 | C1 | C1 | C1 |
|  | Thickness (μm) | 1500 | 1500 | 1500 | 1500 | 1500 | 1500 | 1500 | 1500 |
| D | A (mass %) | 3.8 | 0.8 | 10.5 | 3.8 | 3.8 | 3.8 | 3.8 | 3.8 |
|  | B (mass %) | 6.0 | 6.2 | 5.6 | 6.0 | 6.0 | 6.0 | 6.0 | 6.0 |
|  | C (mass %) | 90.2 | 93.0 | 83.9 | 90.2 | 90.2 | 90.2 | 90.2 | 90.2 |
|  | Mg (μmol/g) | 0.26 | 0.22 | 0.36 | 0.26 | 0.26 | 0.12 | 0.56 | 0.26 |
|  | K + Na (μmol/g) | 0.33 | 0.08 | 1.05 | 0.38 | 0.38 | 0.38 | 0.38 | 0.38 |
|  | Al (ppm) | 6.0 | 6.2 | 5.6 | 6.0 | 6.0 | 1.9 | 15.0 | 6.0 |
|  | Ti (ppm) | 0.14 | 0.15 | 0.13 | 0.14 | 0.14 | 0.14 | 0.14 | 0.00 |
|  | Ta/Tb | 0.5 | 0.1 | 1.5 | 0.5 | 0.5 | 0.5 | 0.5 | 0.5 |
|  | Thickness (μm) | 1800 | 1800 | 1800 | 1800 | 1800 | 1800 | 1800 | 1800 |
| Ta/Tt |  | 0.020 | 0.0040 | 0.057 | 0.020 | 0.020 | 0.020 | 0.020 | 0.020 |
| Tb/Tt |  | 0.039 | 0.040 | 0.038 | 0.039 | 0.039 | 0.039 | 0.039 | 0.039 |
| (Tc + Td)/Tt |  | 0.94 | 0.96 | 0.91 | 0.94 | 0.94 | 0.94 | 0.94 | 0.94 |
| Td/(Tc + Td) |  | 0.38 | 0.38 | 0.38 | 0.38 | 0.38 | 0.38 | 0.38 | 0.38 |
| Ma/Mb |  | 9.4 | 2.1 | 2.1 | 2.1 | 2.1 | 2.1 | 2.1 | 2.1 |
| Ma/Mc |  | 243 | 54 | 54 | 54 | 54 | 54 | 54 | 54 |
| Ta/Tb |  | 0.50 | 0.10 | 1.5 | 0.50 | 0.50 | 0.50 | 0.50 | 0.50 |
| (VA × Ta)/(MT × Tb) |  | 4.9 | 1.0 | 15 | 4.9 | 4.9 | 16 | 1.9 | 4.9 |
| Amount of foreign matter (g) |  | 0.6 | 0.8 | 0.3 | 0.9 | 0.9 | 0.6 | 0.5 | 0.3 |
| Oxygen transmission rate (cc, μm/m², day) |  | 0.08 | 0.40 | 0.03 | 0.08 | 0.08 | 0.08 | 0.08 | 0.08 |
| Fuel permeation amount (g) |  | 0.31 | 1.55 | 0.10 | 0.31 | 0.31 | 0.31 | 0.31 | 0.31 |
| Impact resistance (multilayer) |  | A | A | B | A | A | A | A | A |
| Impact resistance (D single layer) |  | A | A | B | A | A | A | A | A |

TABLE 5

|   |   | Example 17 | Example 18 | Example 19 | Example 20 | Example 21 | Example 22 | Example 23 | Example 24 | Example 25 |
|---|---|---|---|---|---|---|---|---|---|---|
| A | Type | A1 | A1 | A1 | A1 | A1 | A1 | A1 | A1 | A1 |
|   | Thickness (μm) | 100 | 100 | 100 | 100 | 100 | 100 | 100 | 100 | 100 |
| B | Type | B7 | B8 | B9 | B1 | B1 | B1 | B1 | B1 | B1 |
|   | Thickness (μm) | 100 | 100 | 100 | 4 | 300 | 100 | 100 | 100 | 100 |
| C | Type | C1 | C1 | C1 | C1 | C1 | C2 | C3 | C4 | C1 |
|   | Thickness (μm) | 1500 | 1500 | 1500 | 1500 | 1500 | 1500 | 1500 | 1500 | 300 |
| D | A (mass %) | 3.8 | 3.8 | 3.8 | 4.0 | 3.4 | 3.8 | 3.8 | 3.8 | 13.5 |
|   | B (mass %) | 6.0 | 6.0 | 6.0 | 0.3 | 16.1 | 6.0 | 6.0 | 6.0 | 21.6 |
|   | C (mass %) | 90.2 | 90.2 | 90.2 | 95.7 | 80.5 | 90.2 | 90.2 | 90.2 | 64.9 |
|   | Mg (μmol/g) | 0.26 | 0.26 | 0.26 | 0.07 | 0.59 | 0.71 | 0.26 | 0.26 | 0.93 |
|   | K + Na (μmol/g) | 0.38 | 0.38 | 0.38 | 0.40 | 0.34 | 0.38 | 0.38 | 0.38 | 1.35 |
|   | Al (ppm) | 6.0 | 6.0 | 6.0 | 0.3 | 16.1 | 6.0 | 6.0 | 6.0 | 21.6 |
|   | Ti (ppm) | 1.20 | 0.14 | 0.14 | 0.01 | 0.39 | 0.14 | 0.14 | 0.14 | 0.52 |
|   | Ta/Tb | 0.5 | 0.5 | 0.5 | 12.5 | 0.167 | 0.5 | 0.5 | 0.5 | 0.5 |
|   | Thickness (μm) | 1800 | 1800 | 1800 | 1800 | 1800 | 1800 | 1800 | 1800 | 1800 |
| Ta/Tt |   | 0.020 | 0.020 | 0.020 | 0.020 | 0.018 | 0.020 | 0.020 | 0.020 | 0.037 |
| Tb/Tt |   | 0.039 | 0.039 | 0.039 | 0.0016 | 0.11 | 0.039 | 0.039 | 0.039 | 0.074 |
| (Tc + Td)/Tt |   | 0.94 | 0.94 | 0.94 | 0.98 | 0.87 | 0.94 | 0.94 | 0.94 | 0.89 |
| Td/(Tc + Td) |   | 0.38 | 0.38 | 0.38 | 0.38 | 0.38 | 0.38 | 0.38 | 0.38 | 0.75 |
| Ma/Mb |   | 2.1 | 7.6 | 0.38 | 2.1 | 2.1 | 2.1 | 2.1 | 2.1 | 2.1 |
| Ma/Mc |   | 54 | 54 | 54 | 54 | 54 | 54 | 380 | 13 | 54 |
| Ta/Tb |   | 0.50 | 0.50 | 0.50 | 13 | 0.17 | 0.50 | 0.50 | 0.50 | 0.50 |
| (VA × Ta)/(MT × Tb) |   | 4.9 | 4.9 | 4.9 | 122 | 1.6 | 4.9 | 4.9 | 4.9 | 4.9 |
| Amount of foreign matter (g) |   | 0.3 | 0.3 | 0.4 | 0.8 | 0.5 | 0.8 | 0.7 | 0.3 | 0.4 |
| Oxygen transmission rate (cc, μm/m², day) |   | 0.08 | 0.08 | 0.08 | 0.08 | 0.08 | 0.08 | 0.08 | 0.08 | 0.08 |
| Fuel permeation amount (g) |   | 0.31 | 0.31 | 0.31 | 0.31 | 0.31 | 0.31 | 0.31 | 0.31 | 0.31 |
| Impact resistance (multilayer) |   | A | A | A | A | A | A | A | A | B |
| Impact resistance (D single layer) |   | A | A | A | A | A | A | A | A | B |

|   |   | Example 26 | Example 27 | Example 28 | Example 29 | Example 30 | Example 31 | Example 32 | Example 33 |
|---|---|---|---|---|---|---|---|---|---|
| A | Type | A1 | A1 | A1 | A1 | A1 | A10 | A11 | A10 |
|   | Thickness (μm) | 100 | 20 | 100 | 100 | 300 | 100 | 100 | 100 |
| B | Type | B1 | B1 | B1 | B1 | B4 | B9 | B8 | B1 |
|   | Thickness (μm) | 100 | 300 | 100 | 100 | 4 | 100 | 100 | 100 |
| C | Type | C1 | C1 | C1 | C1 | C1 | C1 | C1 | C4 |
|   | Thickness (μm) | 3000 | 1500 | 1500 | 1500 | 300 | 1500 | 1500 | 1500 |
| D | A (mass %) | 2.0 | 0.7 | 3.8 | 3.8 | 38.2 | 3.8 | 3.8 | 3.8 |
|   | B (mass %) | 3.2 | 16.5 | 6.0 | 6.0 | 0.8 | 6.0 | 6.0 | 6.0 |
|   | C (mass %) | 94.8 | 82.8 | 90.2 | 90.2 | 61.0 | 90.2 | 90.2 | 90.2 |
|   | Mg (μmol/g) | 0.14 | 0.55 | 0.26 | 0.26 | 0.64 | 0.26 | 0.26 | 0.26 |
|   | K + Na (μmol/g) | 0.20 | 0.07 | 0.38 | 0.38 | 3.81 | 0.38 | 0.38 | 0.38 |
|   | Al (ppm) | 3.2 | 16.5 | 6.0 | 6.0 | 0.3 | 6.0 | 6.0 | 6.0 |
|   | Ti (ppm) | 0.08 | 0.40 | 0.14 | 0.14 | 0.02 | 0.14 | 0.14 | 0.14 |
|   | Ta/Tb | 0.5 | 0.0333 | 0.5 | 0.5 | 37.5 | 0.5 | 0.5 | 0.5 |
|   | Thickness (μm) | 1800 | 1800 | 100 | 16000 | 1800 | 1800 | 1800 | 1800 |
| Ta/Tt |   | 0.012 | 0.0037 | 0.029 | 0.0052 | 0.11 | 0.020 | 0.020 | 0.020 |
| Tb/Tt |   | 0.025 | 0.11 | 0.059 | 0.0104 | 0.0030 | 0.039 | 0.039 | 0.039 |
| (Tc + Td)/Tt |   | 0.96 | 0.89 | 0.91 | 0.98 | 0.89 | 0.94 | 0.94 | 0.94 |
| Td/(Tc + Td) |   | 0.23 | 0.38 | 0.03 | 0.84 | 0.75 | 0.38 | 0.38 | 0.38 |
| Ma/Mb |   | 2.1 | 2.1 | 2.1 | 2.1 | 2.1 | 0.10 | 34 | 0.56 |
| Ma/Mc |   | 54 | 54 | 54 | 54 | 54 | 14 | 243 | 3 |
| Ta/Tb |   | 0.50 | 0.033 | 0.50 | 0.50 | 38 | 0.50 | 0.50 | 0.50 |
| (VA × Ta)/(MT × Tb) |   | 4.9 | 0.32 | 4.9 | 4.9 | 972 | 4.9 | 4.9 | 4.9 |
| Amount of foreign matter (g) |   | 0.3 | 0.3 | 0.3 | 0.7 | 0.8 | 0.5 | 0.7 | 0.3 |

TABLE 5-continued

| | | | | | | | | |
|---|---|---|---|---|---|---|---|---|
| Oxygen transmission rate (cc, μm/m², day) | 0.08 | 0.40 | 0.08 | 0.08 | 0.03 | 0.08 | 0.08 | 0.08 |
| Fuel permeation amount (g) | 0.31 | 1.55 | 0.31 | 0.31 | 0.10 | 0.31 | 0.31 | 0.31 |
| Impact resistance (multilayer) | A | A | A | B | B | A | A | A |
| Impact resistance (D single layer) | A | A | A | B | B | A | A | A |

TABLE 6

| | | Example 34 | Example 35 | Example 36 | Comparative Example 1 | Comparative Example 2 | Comparative Example 3 | Comparative Example 4 | Comparative Example 5 |
|---|---|---|---|---|---|---|---|---|---|
| A | Type | A11 | A15 | A16 | A12 | A13 | A14 | A1 | A1 |
| | Thickness (μm) | 100 | 100 | 100 | 100 | 100 | 100 | 10 | 100 |
| B | Type | B1 | B16 | B17 | B1 | B10 | B11 | B1 | B12 |
| | Thickness (μm) | 100 | 100 | 100 | 100 | 100 | 100 | 100 | 100 |
| C | Type | C3 | C1 | C1 | C1 | C1 | C1 | C1 | C1 |
| | Thickness (μm) | 1500 | 1500 | 1500 | 1500 | 1500 | 1500 | 1500 | 1500 |
| D | A (mass %) | 3.8 | 3.8 | 3.8 | 3.6 | 3.8 | 3.8 | 0.4 | 3.8 |
| | B (mass %) | 6.0 | 6.0 | 6.0 | 6.0 | 6.0 | 6.0 | 6.2 | 6.0 |
| | C (mass %) | 90.2 | 90.2 | 90.2 | 90.4 | 90.2 | 90.2 | 93.4 | 90.2 |
| | Mg (μmol/g) | 0.26 | 0.10 [1)] | 0.16 [2)] | 0.20 | 0.26 | 0.26 | 0.21 | 0.26 |
| | K + Na (μmol/g) | 0.38 | 0.38 | 0.38 | 0.35 | 0.38 | 0.38 | 0.04 | 0.38 |
| | Al (ppm) | 6.0 | 6.0 | 6.0 | 6.0 | 6.0 | 6.0 | 6.2 | 6.0 |
| | Ti (ppm) | 0.14 | 0.14 | 0.14 | 0.14 | 0.14 | 0.14 | 0.15 | 0.14 |
| | Ta/Tb | 0.5 | 0.5 | 0.5 | 0.5 | 0.5 | 0.5 | 0.05 | 0.5 |
| | Thickness (μm) | 1800 | 1800 | 1800 | 1800 | 1800 | 1800 | 1800 | 1800 |
| Ta/Tt | | 0.020 | 0.020 | 0.020 | 0.020 | 0.020 | 0.020 | 0.0020 | 0.020 |
| Tb/Tt | | 0.039 | 0.039 | 0.039 | 0.039 | 0.039 | 0.039 | 0.040 | 0.039 |
| (Tc + Td)/Tt | | 0.94 | 0.94 | 0.94 | 0.94 | 0.94 | 0.94 | 0.96 | 0.94 |
| Td/(Tc + Td) | | 0.38 | 0.38 | 0.38 | 0.38 | 0.38 | 0.38 | 0.38 | 0.38 |
| Ma/Mb | | 9.4 | 2.1 | 2.1 | 2.0 | 73 | 0.033 | 2.1 | 2.1 |
| Ma/Mc | | 1700 | 54 | 54 | 51 | 314 | 7 | 54 | 54 |
| Ta/Tb | | 0.50 | 0.50 | 0.50 | 0.50 | 0.50 | 0.50 | 0.050 | 0.50 |
| (VA × Ta)/(MT × Tb) | | 4.9 | 13.1 | 8.0 | 7.3 | 4.9 | 4.9 | 0.49 | 4.9 |
| Amount of foreign matter (g) | | 0.8 | 0.6 | 0.5 | 0.4 | 1.2 | 2 | 0.6 | 2.1 |
| Oxygen transmission rate (cc, μm/m², day) | | 0.08 | 0.08 | 0.08 | 0.64 | 0.08 | 0.08 | 0.80 | 0.08 |
| Fuel permeation amount (g) | | 0.31 | 0.31 | 0.31 | 2.41 | 0.31 | 0.31 | 3.01 | 0.31 |
| Impact resistance (multilayer) | | A | A | A | A | A | A | A | A |
| Impact resistance (D single layer) | | A | A | A | A | A | A | A | A |

| | | Comparative Example 6 | Comparative Example 7 | Comparative Example 8 | Comparative Example 9 | Comparative Example 10 | Comparative Example 11 | Comparative Example 12 | Comparative Example 13 |
|---|---|---|---|---|---|---|---|---|---|
| A | Type | A1 | A1 | A1 | A1 | A1 | A1 | A1 | A13 |
| | Thickness (μm) | 100 | 100 | 100 | 100 | 100 | 100 | 300 | 100 |
| B | Type | B13 | B14 | B15 | B1 | B1 | B1 | B4 | B1 |
| | Thickness (μm) | 100 | 100 | 100 | 3 | 350 | 100 | 4 | 100 |
| C | Type | C1 | C1 | C1 | C1 | C1 | C1 | C1 | C3 |
| | Thickness (μm) | 1500 | 1500 | 1500 | 1500 | 1500 | 1500 | 300 | 1500 |
| D | A (mass %) | 3.8 | 3.8 | 3.8 | 4.0 | 3.3 | 3.8 | 38.2 | 3.8 |
| | B (mass %) | 6.0 | 6.0 | 6.0 | 0.2 | 18.3 | 6.0 | 0.8 | 6.0 |
| | C (mass %) | 90.2 | 90.2 | 90.2 | 95.8 | 78.4 | 90.2 | 61.0 | 90.2 |
| | Mg (μmol/g) | 0.26 | 0.09 | 0.68 | 0.07 | 0.66 | 0.26 | 0.64 | 0.26 |
| | K + Na (μmol/g) | 0.38 | 0.38 | 0.38 | 0.40 | 0.33 | 0.38 | 3.81 | 0.38 |
| | Al (ppm) | 6.0 | 0.8 | 18.8 | 0.2 | 18.3 | 6.0 | 0.3 | 6.0 |
| | Ti (ppm) | 0.14 | 0.14 | 0.14 | 0.00 | 0.44 | 0.14 | 0.02 | 0.14 |
| | Ta/Tb | 0.5 | 0.5 | 0.5 | 16.667 | 0.143 | 0.5 | 37.5 | 0.5 |

TABLE 6-continued

| | | | | | | | | |
|---|---|---|---|---|---|---|---|---|
| Thickness (μm) | 1800 | 1800 | 1800 | 1800 | 1800 | 30000 | 1300 | 1800 |
| Ta/Tt | 0.020 | 0.020 | 0.020 | 0.020 | 0.018 | 0.0030 | 0.136 | 0.020 |
| Tb/Tt | 0.039 | 0.039 | 0.039 | 0.0012 | 0.13 | 0.0060 | 0.0036 | 0.039 |
| (Tc + Td)/Tt | 0.94 | 0.94 | 0.94 | 0.98 | 0.86 | 0.991 | 0.86 | 0.94 |
| Td/(Tc + Td) | 0.38 | 0.38 | 0.38 | 0.38 | 0.38 | 0.91 | 0.68 | 0.38 |
| Ma/Mb | 2.1 | 2.1 | 2.1 | 2.1 | 2.1 | 2.1 | 2.1 | 12 |
| Ma/Mc | 54 | 54 | 54 | 54 | 54 | 54 | 54 | 2200 |
| Ta/Tb | 0.50 | 0.50 | 0.50 | 17 | 0.14 | 0.50 | 38 | 0.50 |
| (VA × Ta)/(MT × Tb) | 4.9 | 39 | 1.6 | 162 | 1.4 | 4.9 | 972 | 4.9 |
| Amount of foreign matter (g) | 2.4 | 1.3 | 1.7 | 2.9 | 1.2 | 1.1 | 1.9 | 3.0 |
| Oxygen transmission rate (cc, μm/m², day) | 0.08 | 0.08 | 0.08 | 0.08 | 0.08 | 0.08 | 0.03 | 0.08 |
| Fuel permeation amount (g) | 0.31 | 0.31 | 0.31 | 0.31 | 0.31 | 0.31 | 0.10 | 0.31 |
| Impact resistance (multilayer) | A | A | A | A | A | D | D | A |
| Impact resistance (D single layer) | A | A | A | A | A | D | D | A |

1) Zn content,
2) Ca content

The invention claimed is:

1. A fuel container composed of a multilayer structure comprising:
   a first layer comprising an ethylene-vinyl alcohol copolymer;
   a second layer comprising an adhesive resin;
   a third layer comprising a high-density polyethylene; and
   a fourth layer comprising a resin composition, wherein the resin composition comprises the ethylene-vinyl alcohol copolymer, the adhesive resin and the high-density polyethylene,
   wherein the ethylene-vinyl alcohol copolymer comprises from 15 to 44 mol % of ethylene,
   the adhesive resin is a maleic anhydride-modified polyolefin having an acid value of from 0.1 to 10 mgKOH/g and comprising from 1 to 8.5 μmol/g of magnesium element, calcium element, zinc element, or a combination thereof, and
   the fuel container satisfies formulas (1) to (6):

$$0.05 \leq Ma/Mb \leq 40 \quad (1);$$

$$2 \leq Ma/Mc \leq 1800 \quad (2),$$

wherein Ma represents an MFR (g/10 min) of the ethylene-vinyl alcohol copolymer, measured at 210° C. under a load of 2160 g;
   Mb represents an MFR (g/10 min) of the adhesive resin, measured at 210° C. under a load of 2160 g; and
   Mc represents an MFR (g/10 min) of the high-density polyethylene, measured at 210° C. under a load of 2160 g;

$$0.003 \leq Ta/Tt \leq 0.12 \quad (3);$$

$$0.0015 \leq Tb/Tt \leq 0.12 \quad (4);$$

$$0.83 \leq (Tc+Td)/Tt \leq 0.99 \quad (5); \text{ and}$$

$$0.02 \leq Td/(Tc+Td) \leq 0.90 \quad (6),$$

wherein Ta represents a total thickness of the first layer, Tb represents a total thickness of the second layer, Tc represents a total thickness of the third layer, Td represents a total thickness of the fourth layer, and Tt represents an overall thickness (Ta+Tb+Tc+Td).

2. The fuel container according to claim 1, wherein the resins consist of from 1 to 20 mass % of the ethylene-vinyl alcohol copolymer, from 1 to 20 mass % of the adhesive resin, and from 60 to 98 mass % of the high-density polyethylene.

3. The fuel container according to claim 1, satisfying formula (7):

$$0.3 \leq (VA \times Ta)/(MT \times Tb) \leq 1000 \quad (7),$$

wherein VA represents a vinyl alcohol content (mol %) in the ethylene-vinyl alcohol copolymer;
MT represents a total amount (μmol/g) of magnesium element, calcium element, and zinc element in the adhesive resin;
Ta represents the total thickness (μm) of the first layer; and
Tb represents the total thickness (μm) of the second layer.

4. The fuel container according to claim 1, wherein the resin composition further comprises from 0.001 to 1 μmol/g of magnesium element, calcium element, zinc element, or a combination thereof.

5. The fuel container according to claim 1, wherein the resin composition further comprises from 0.001 to 5 μmol/g of an alkali metal element.

6. The fuel container according to claim 1, wherein the ethylene-vinyl alcohol copolymer further comprises from 0.04 to 13 μmol/g of an alkali metal element.

7. The fuel container according to claim 1, wherein the maleic anhydride-modified polyolefin further comprises from 0.35 to 11.5 μmol/g of aluminum element and 0.5 μmol/g or less of titanium element.

8. The fuel container according to claim 1, wherein the high-density polyethylene comprises at least one element selected from the group consisting of magnesium element, calcium element, and zinc element for a total amount of 0.5 μmol/g or less.

9. The fuel container according to claim 1, wherein the first layer and the second layer are in contact with each other.

10. The fuel container according to claim 1, wherein the ethylene-vinyl alcohol copolymer comprises from 18 to 38 mol % of ethylene.

11. A fuel container composed of a multilayer structure comprising:

a first layer comprising an ethylene-vinyl alcohol copolymer;
a second layer comprising an adhesive resin;
a third layer comprising a high-density polyethylene; and
a fourth layer comprising a resin composition, wherein the resin composition comprises the ethylene-vinyl alcohol copolymer, the adhesive resin and the high-density polyethylene,
wherein the ethylene-vinyl alcohol copolymer comprises from 15 to 44 mol % of ethylene,
the adhesive resin is a maleic anhydride-modified polyolefin having an acid value of from 0.1 to 10 mgKOH/g and comprising from 1 to 8.5 µmol/g of magnesium element, calcium element, zinc element, or a combination thereof, and the fuel container satisfies formulas (1) to (6):

$$0.05 \leq Ma/Mb \leq 40 \quad (1);$$

$$2 \leq Ma/Mc \leq 1800 \quad (2);$$

wherein Ma represents an MFR (g/10 min) of the ethylene-vinyl alcohol copolymer, measured at 210° C. under a load of 2160 g, Mb represents an MFR (g/10 min) of the adhesive resin, measured at 210° C. under a load of 2160 g, and Mc represents an MFR (g/10 min) of the high-density polyethylene, measured at 210° C. under a load of 2160 g;

$$0.003 \leq Ta/Tt \leq 0.12 \quad (3);$$

$$0.0015 \leq Tb/Tt \leq 0.12 \quad (4);$$

$$0.83 \leq (Tc+Td)/Tt \leq 0.99 \quad (5); \text{ and}$$

$$0.02 \leq Td/(Tc+Td) \leq 0.90 \quad (6),$$

wherein Ta represents a total thickness of the first layer, Tb represents a total thickness of the second layer, Tc represents a total thickness of the third layer, Td represents a total thickness of the fourth layer, and Tt represents an overall thickness (Ta+Tb+Tc+Td), and wherein the high-density polyethylene comprises at least one element selected from the group consisting of magnesium element, calcium element, and zinc element.

12. The fuel container according to claim 11, wherein the resin composition comprises from 1 to 20 mass % of the ethylene-vinyl alcohol copolymer, from 1 to 20 mass % of the adhesive resin, and from 60 to 98 mass % of the high-density polyethylene.

13. The fuel container according to claim 11, satisfying formula $$0.3 \leq (VA \times Ta)/(MT \times Tb) \leq 1000 \quad (7),$$

wherein VA represents a vinyl alcohol content (mol %) in the ethylene-vinyl alcohol copolymer;
MT represents a total amount (µmol/g) of magnesium element, calcium element, and zinc element in the adhesive resin;
Ta represents the total thickness (µm) of the first layer; and
Tb represents the total thickness (µm) of the second layer.

14. The fuel container according to claim 11, wherein the resin composition further comprises from 0.001 to 1 µmol/g of magnesium element, calcium element, zinc element, or a combination thereof.

15. The fuel container according to claim 11, wherein the resin composition further comprises from 0.001 to 5 µmol/g of an alkali metal element.

16. The fuel container according to claim 11, wherein the ethylene-vinyl alcohol copolymer further comprises from 0.04 to 13 µmol/g of an alkali metal element.

17. The fuel container according to claim 11, wherein the maleic anhydride-modified polyolefin further comprises from 0.35 to 11.5 µmol/g of aluminum element and 0.5 µmol/g or less of titanium element.

18. The fuel container according to claim 11, wherein the first layer and the second layer are in contact with each other.

19. The fuel container according to claim 11, wherein the ethylene-vinyl alcohol copolymer comprises from 18 to 38 mol % of ethylene.

* * * * *

UNITED STATES PATENT AND TRADEMARK OFFICE
CERTIFICATE OF CORRECTION

PATENT NO. : 11,279,117 B2
APPLICATION NO. : 16/307006
DATED : March 22, 2022
INVENTOR(S) : Takeyuki Igarashi et al.

Page 1 of 1

It is certified that error appears in the above-identified patent and that said Letters Patent is hereby corrected as shown below:

In the Claims

In Claim 1 "a fourth layer comprising a resin composition, wherein the resin composition comprises the ethylene-vinyl alcohol copolymer, the adhesive resin and the high-density polyethylene," should read --a fourth layer comprising a resin composition, wherein the resin composition comprises resins wherein the resins consist of the ethylene-vinyl alcohol copolymer, the adhesive resin and the high-density polyethylene,--.

Signed and Sealed this
Twentieth Day of September, 2022

Katherine Kelly Vidal
*Director of the United States Patent and Trademark Office*